(12) United States Patent
Tachibana et al.

(10) Patent No.: US 11,078,309 B2
(45) Date of Patent: Aug. 3, 2021

(54) VINYL ALCOHOL-BASED POLYMER HAVING OLEFIN IN SIDE CHAIN

(71) Applicant: KURARAY CO., LTD., Kurashiki (JP)

(72) Inventors: Yuki Tachibana, Kurashiki (JP); Yusuke Amano, Kurashiki (JP); Kazuhiko Maekawa, Kurashiki (JP)

(73) Assignee: KURARAY CO., LTD., Kurashiki (JP)

( * ) Notice: Subject to any disclaimer, the term of this patent is extended or adjusted under 35 U.S.C. 154(b) by 0 days.

(21) Appl. No.: 16/619,152

(22) PCT Filed: Jun. 5, 2018

(86) PCT No.: PCT/JP2018/021579
§ 371 (c)(1),
(2) Date: Dec. 4, 2019

(87) PCT Pub. No.: WO2018/225742
PCT Pub. Date: Dec. 13, 2018

(65) Prior Publication Data
US 2020/0157255 A1    May 21, 2020

(30) Foreign Application Priority Data
Jun. 5, 2017 (JP) .............................. JP2017-111037

(51) Int. Cl.
*C08F 8/32* (2006.01)
*C08F 16/06* (2006.01)

(52) U.S. Cl.
CPC .............. *C08F 16/06* (2013.01); *C08F 8/32* (2013.01)

(58) Field of Classification Search
CPC ........ C08F 216/06; C08F 8/16; C08F 220/54; C08F 8/32
See application file for complete search history.

(56) References Cited

U.S. PATENT DOCUMENTS

| | | | |
|---|---|---|---|
| 6,081,312 A | 6/2000 | Aminaka et al. | |
| 7,714,086 B2 * | 5/2010 | Scheibel | C08F 8/12 526/193 |
| 2014/0350169 A1 | 11/2014 | Kaneshima et al. | |
| 2016/0083490 A1 | 3/2016 | Kumaki et al. | |

FOREIGN PATENT DOCUMENTS

| | | | | |
|---|---|---|---|---|
| JP | 56-8408 A | 1/1981 | | |
| JP | 4-255702 A | 9/1992 | | |
| JP | 4-283749 A | 10/1992 | | |
| JP | 10-312166 A | 11/1998 | | |
| JP | 2001-72720 A | 3/2001 | | |
| JP | 2001072720 A | * | 3/2001 | ............ C08F 218/04 |
| WO | WO 2013/105188 A1 | 7/2013 | | |
| WO | WO 2014/171502 A1 | 10/2014 | | |

OTHER PUBLICATIONS

International Search Report dated Aug. 14, 2018 in PCT/JP2018/021579 filed on Jun. 5, 2018, 1 page.

* cited by examiner

*Primary Examiner* — Mark S Kaucher
(74) *Attorney, Agent, or Firm* — Oblon, McClelland, Maier & Neustadt, L.L.P.

(57) ABSTRACT

There is provided a vinyl alcohol-based polymer having an olefin in side chain, comprising 0.001 to 10 mol % of a structural unit represented by Formula (1) based on the total amount of structural units, wherein the total carbon number of X, $R^1$, $R^2$, $R^3$ and $R^4$ is 2 or more. The vinyl alcohol-based polymer having an olefin in side chain has excellent storage stability, good solubility in water or an organic solvent even after thermal treatment, and excellent reactivity to high energy beam. In Formula (1), X represents an optionally substituted divalent aliphatic hydrocarbon group, an optionally substituted divalent alicyclic hydrocarbon group, an optionally substituted divalent aromatic hydrocarbon group, or a group consisting of two or more of these groups which are linked via at least one bond selected from the group consisting of an amide bond, an ester bond, an ether bond, and a sulfide bond; $R^1$, $R^2$, $R^3$ and $R^4$, independently of each other, represents a hydrogen atom, an optionally substituted aliphatic hydrocarbon group, an optionally substituted alicyclic hydrocarbon group, or an optionally substituted aromatic hydrocarbon group; and X, $R^1$, $R^2$, $R^3$ and $R^4$ can be arbitrarily combined to form a ring structure).

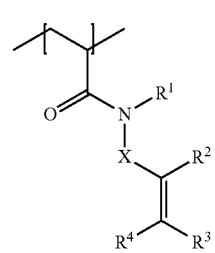

(1)

6 Claims, No Drawings

VINYL ALCOHOL-BASED POLYMER HAVING OLEFIN IN SIDE CHAIN

TECHNICAL FIELD

The present invention relates to a novel modified vinyl alcohol-based polymer having an olefin in side chain and a method for producing the modified vinyl alcohol-based polymer.

BACKGROUND ART

Vinyl alcohol-based polymers have been extensively used for emulsifiers, suspending agents, surfactants, fiber processing agents, various binders, paper processing agents, adhesives, various packaging materials, sheets, containers and so on because of excellent film properties (strength, oil resistance, film-formability, oxygen gas barrier properties and so on) owing to higher crystallinity and hydrophilicity. However, a vinyl alcohol-based polymer generally has defects in physical properties which may be significant problems depending on an application, such as significant deterioration in physical properties under a high humidity due to high hydrophilicity, and low reactivity. For solving these problems, attempts have been made for higher functions including improvement in a particular performance by introducing a functional group, and a variety of so-called modified vinyl alcohol-based polymers have been developed.

An olefin, which is a reactive functional group, can be introduced into a side chain of a vinyl alcohol-based polymer to allow for making the polymer water-resistant by high-energy beam crosslinking, modifying the polymer by graft polymerization, and so on.

Several types of modified vinyl alcohol-based polymers having an olefin in side chain have been suggested. For instance, Patent Reference No. 1 has illustrated a modified vinyl alcohol-based polymer in which a methacrylate group is introduced into a side chain by using glycidyl methacrylate, and Patent Reference No. 2 has illustrated a modified vinyl alcohol-based polymer in which an acrylamide group is introduced into a side chain by using a methacrylamide compound. Patent Reference No. 3 has also illustrated a modified vinyl alcohol-based polymer in which an acrylate group is introduced into a side chain. However, an α,β-unsaturated olefin such as an acrylate group, a methacrylate group and an acrylamide group is so reactive that the functional groups can mutually cross-link during storing a modified vinyl alcohol-based polymer, resulting in an insolubilized polymer, which is disadvantageous in terms of storage stability.

Patent Reference No. 4 has illustrated a modified vinyl alcohol-based polymer having an olefin which is not an α,β-unsaturated type, in side chain, by using 1,4-butanediol divinyl ether or the like. However, a structure introduced into a side chain is hydrophobic, and the polymer tends to gelate in the course of a manufacturing process, which represents a problem in stability. Thus, there has been needed a vinyl alcohol-based polymer which is highly soluble in water or an organic solvent, excellent in storage stability and suitably reactive.

PRIOR ART REFERENCES

Patent References

Patent Reference No. 1: JP 1992-283749A
Patent Reference No. 2: JP 2001-72720A
Patent Reference No. 3: JP 10-312166A
Patent Reference No. 4: WO 2014/171502

SUMMARY OF THE INVENTION

Problems to be Solved by the Invention

To solve the above problems, an objective of the present invention is to provide a vinyl alcohol-based polymer having an olefin in side chain which is excellent in storage stability, highly soluble in water or an organic solvent even after thermal treatment, and highly reactive to a high energy beam.

Means for Solving the Problems

After intense investigation for solving the above problems, we have found that a vinyl alcohol-based polymer having an olefin in side chain which is excellent in storage stability, highly soluble in water or an organic solvent even after thermal treatment, and highly reactive to a high energy beam can be provided by introducing a particular structure having an olefin in a side chain of a vinyl alcohol-based polymer, achieving the present invention.

Specifically, the above problems can be solved by providing the followings:

A vinyl alcohol-based polymer having an olefin in side chain, comprising 0.001 to 10 mol % of a structural unit represented by Formula (1) based on the total amount of structural units, wherein the total carbon number of X, $R^1$, $R^2$, $R^3$ and $R^4$ is 2 or more:

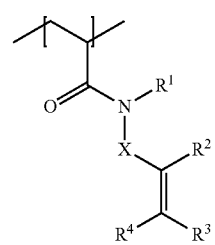

(1)

wherein X represents an optionally substituted divalent aliphatic hydrocarbon group, an optionally substituted divalent alicyclic hydrocarbon group, an optionally substituted divalent aromatic hydrocarbon group, or a group consisting of two or more of these groups which are linked via at least one bond selected from the group consisting of an amide bond, an ester bond, an ether bond, and a sulfide bond; $R^1$, $R^2$, $R^3$ and $R^4$, independently of each other, represents a hydrogen atom, an optionally substituted aliphatic hydrocarbon group, an optionally substituted alicyclic hydrocarbon group, or an optionally substituted aromatic hydrocarbon group; and X, $R^1$, $R^2$, $R^3$ and $R^4$ can be arbitrarily combined to form a ring structure.

[2] The vinyl alcohol-based polymer having an olefin in side chain as described in [1], wherein the total carbon number of X, $R^1$, $R^2$, $R^3$ and $R^4$ is 4 to 7.

[3] The vinyl alcohol-based polymer having an olefin in side chain as described in [1] or [2], wherein $R^1$ is a hydrogen atom.

[4] The vinyl alcohol-based polymer having an olefin in side chain as described in any of [1] to [3], wherein X is an optionally substituted divalent aliphatic hydrocarbon group.

[5] The vinyl alcohol-based polymer having an olefin in side chain as described in any of [1] to [4], wherein both $R^3$ and $R^4$ are a hydrogen atom.

[6] A method for producing the vinyl alcohol-based polymer having an olefin in side chain as described in any of [1] to [5], comprising addition-reacting a vinyl alcohol-based polymer having a structural unit represented by Formula (2) with an amine compound represented by Formula (3):

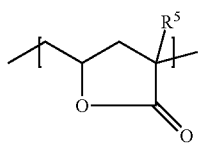

(2)

wherein $R^5$ represents a hydrogen atom or a methyl group;

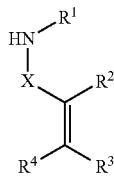

(3)

wherein X, $R^1$, $R^2$, $R^3$ and $R^4$ are as defined in Formula (1).

Effects of the Invention

A vinyl alcohol-based polymer having an olefin in side chain according to the present invention is excellent in storage stability, highly soluble in water or an organic solvent even after thermal treatment, and highly reactive to a high energy beam. It can be, therefore, suitably used for a variety of applications of a vinyl alcohol-based polymer.

MODES FOR CARRYING OUT THE INVENTION

There will be detailed the present invention with reference to embodiments. The present invention is not limited to the embodiments described below in any manner, and various modifications are possible without departing from the spirit and the scope of the present invention.

[Structural Unit Represented by Formula (1)]

A vinyl alcohol-based polymer having an olefin in side chain of the present invention contains 0.001 to 10 mol % of a structural unit represented by Formula (1) based on the total amount of structural units, wherein the total carbon number of X, $R^1$, $R^2$, $R^3$ and $R^4$ is 2 or more.

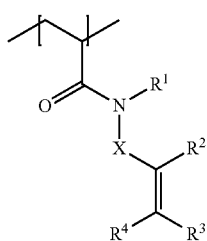

(1)

wherein X represents an optionally substituted divalent aliphatic hydrocarbon group, an optionally substituted divalent alicyclic hydrocarbon group, an optionally substituted divalent aromatic hydrocarbon group, or a group consisting of two or more of these groups which are linked via at least one bond selected from the group consisting of an amide bond, an ester bond, an ether bond, and a sulfide bond; $R^1$, $R^2$, $R^3$ and $R^4$, independently of each other, represents a hydrogen atom, an optionally substituted aliphatic hydrocarbon group, an optionally substituted alicyclic hydrocarbon group, or an optionally substituted aromatic hydrocarbon group; and X, $R^1$, $R^2$, $R^3$ and $R^4$ can be arbitrarily combined to form a ring structure.

Since an olefin present in a repeating unit of a polymer can be crosslinked by a high energy beam, a vinyl alcohol-based polymer having an olefin in side chain of the present invention allows for making the polymer water-resistant and gelation by crosslinking. An olefin in side chain in a vinyl alcohol-based polymer of the present invention, which is not of an α,β-unsaturated type, is so heat-resistant that it can stably exist without being crosslinked during a drying or thermoforming process. Furthermore, an olefin in side chain in a vinyl alcohol-based polymer of the present invention is bound to a main chain of the vinyl alcohol-based polymer via an amide structure, so that it is highly hydrolysis-resistant and thus, for example, can be stably stored for a long period even as an aqueous solution.

In Formula (1), X represents an optionally substituted divalent aliphatic hydrocarbon group, an optionally substituted divalent alicyclic hydrocarbon group, an optionally substituted divalent aromatic hydrocarbon group, or a group consisting of two or more of these groups which are linked via at least one bond selected from the group consisting of an amide bond, an ester bond, an ether bond, and a sulfide bond.

An example of an optionally substituted divalent aliphatic hydrocarbon group is an optionally substituted alkylene group. An example of an optionally substituted divalent alicyclic hydrocarbon group is an optionally substituted cycloalkylene group. An example of an optionally substituted divalent aromatic hydrocarbon group is an optionally substituted arylene group.

Examples of an alkylene group include methylene group, an ethylene group, a propylene group, a butylene group, a pentylene group, a hexylene group, a heptylene group, an octylene group, a nonylene group, and a decylene.

The alkylene group can have a substituent, including a branched structure such as a methyl group and an ethyl group; an alkenyl group such as a vinyl group, an allyl group, a methylvinyl group, a propenyl group, a butenyl group, a pentenyl group, a hexenyl group, a cyclopropenyl group, a cyclobutenyl group, a cyclopentenyl group, and a cyclohexenyl group; an alkynyl group such as an ethynyl group, a propynyl group, a propargyl group, a butynyl group, a pentynyl group, a hexynyl group, and a phenylethynyl group; an aryl group such as a phenyl group, a naphthyl group, an anthryl group, and a phenanthryl group; a heteroaromatic group such as a pyridyl group, a thienyl group, a furyl group, a pyrrolyl group, an imidazolyl group, a pyrazinyl group, an oxazolyl group, a thiazolyl group, a pyrazolyl group, a benzothiazolyl group, and a benzimidazolyl group; an alkoxy group such as a methoxy group, an ethoxy group, a propoxy group, an isopropoxy group, a butoxy group, an isobutoxy group, a sec-butoxy group, a tert-butoxy group, a pentyloxy group, an isopentyloxy group, a neopentyloxy group, a hexyloxy group, a cyclohexyloxy group, a heptyloxy group, an octyloxy group, a nonyloxy group, a decyloxy group, and a dodecyloxy group; an alkylthio group such as a methylthio group, an ethylthio group, a propylthio group, and a butylthio group; an arylthio group such as a phenylthio group and a naphthylthio group; a tri-substituted silyloxy group such as a tert-butyldimethylsilyloxy group, and a tert-butyldiphenylsilyloxy group; an acyloxy group such as an acetoxy group, a propanoyloxy group, a butanoyloxy group, a pivaloyloxy group, and a benzoyloxy group; an alkoxycarbonyl group such as a methoxycarbonyl group, an ethoxycarbonyl group, a propoxycarbonyl group, an isopropoxycarbonyl group, a butoxycarbonyl group, an isobutoxycarbonyl group, a sec-butoxycarbonyl group, a tert-butoxycarbonyl group, a pentyloxycarbonyl group, a hexyloxycarbonyl group, a heptyloxycarbonyl group, and an octyloxycarbonyl group; an alkylsulfinyl group such as a methylsulfinyl group, and an ethylsulfinyl group; an arylsulfinyl group such as a phenylsulfinyl group; a sulfonate ester group such as a methylsulfonyloxy group, an ethylsulfonyloxy group, a phenylsulfonyloxy group, a methoxysulfonyl group, an ethoxysulfonyl group, and a phenyloxysulfonyl group; an amino group; a hydroxy group; a cyano group; a nitro group; and a halogen atom such as a fluorine atom, a chlorine atom, a bromine atom and an iodine atom. Among these, in the light of reactivity, particularly preferred are a branched structure, an alkenyl group, an alkynyl group, an aryl group, an alkoxy group, an acyloxy group, an alkoxycarbonyl group and a hydroxy group, and further preferred are an alkoxy group and a hydroxy group.

An amino group as an example of the above substituent can be a primary amino group (—NH$_2$), or alternatively a secondary amino group or a tertiary amino group. A secondary amino group is a mono-substituted amino group represented by —NHR$^6$ wherein R$^6$ is any monovalent substituent including an alkyl group, an aryl group, an acetyl group, a benzoyl group, a benzenesulfonyl group and a tert-butoxycarbonyl group. Examples of a secondary amino group include a secondary amino group wherein R$^6$ is an alkyl group, such as a methylamino group, an ethylamino group, a propylamino group and an isopropylamino group; and a secondary amino group wherein R$^6$ is an aryl group, such as a phenylamino group and a naphthylamino group. Furthermore, a hydrogen atom in the alkyl or the aryl group in R$^6$ can be replaced by, for example, an acetyl group, a benzoyl group, a benzenesulfonyl group or a tert-butoxycarbonyl group.

A tertiary amino group is a di-substituted amino group represented by —NR$^6$R$^7$ wherein R$^6$ and R$^7$ is any monovalent substituent; R$^7$ can be as defined in R$^6$; and R$^6$ and R$^7$ can be the same or different. Specific examples of a tertiary amino group include tertiary amino groups wherein R$^6$ and R$^7$ is at least one selected from the group consisting of alkyl groups and aryl groups, including a dimethylamino group, a diethylamino group, a dibutylamino group, an ethylmethylamino group, a diphenylamino group and a methylphenylamino group.

Examples of a cycloalkylene group include a cyclopropylene group, a cyclobutylene group, a cyclopentylene group and a cyclohexylene group. These cycloalkylene groups can have a substituent, which can be as mentioned in the description of the above alkylene group.

Examples of an arylene group include a phenylene group, a naphthylene group, an anthrylene group, a phenanthrylene group and a fluorenylene group. These arylene groups can have a substituent, which can be as mentioned in the description of the above alkylene group.

In the light of reactivity, X in Formula (1) is preferably an optionally substituted divalent aliphatic hydrocarbon group or an optionally substituted divalent alicyclic hydrocarbon group, more preferably an optionally substituted divalent aliphatic hydrocarbon group. Among optionally substituted aliphatic hydrocarbon groups, an optionally substituted divalent alkylene group is preferable as X, and the alkylene group has preferably 1 to 15, more preferably 1 to 10 carbon atoms. Among alkylene groups, further preferred is at least one selected from the group consisting of a methylene group, an ethylene group, a propylene group, an isopropylene group, a butylene group, an isobutylene group, a sec-butylene group, a tert-butylene group, a pentylene group, an isopentylene group and a neo-pentylene group. Among optionally substituted alicyclic hydrocarbon groups, an optionally substituted cycloalkylene group is preferable as X. Among cycloalkylene groups, more preferred is at least one selected from the group consisting of a cyclopropylene group, a cyclobutylene group and a cyclopentylene group.

In Formula (1), R$^1$, R$^2$, R$^3$ and R$^4$ independently of one another represent a hydrogen atom, an optionally substituted aliphatic hydrocarbon group, an optionally substituted alicyclic hydrocarbon group or an optionally substituted aromatic hydrocarbon group.

Examples of an optionally substituted aliphatic hydrocarbon group include an optionally substituted alkyl group, an optionally substituted alkenyl group and an optionally substituted alkynyl group. Examples of an optionally substituted alicyclic hydrocarbon group include an optionally substituted cycloalkyl group. Examples of an optionally substituted aromatic hydrocarbon group include an optionally substituted aryl group and an optionally substituted arylalkyl group.

Examples of an alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a tert-pentyl group, an n-hexyl group, an isohexyl group, a 2-ethylhexyl group, an n-heptyl group, an n-octyl group, an n-nonyl group and an n-decyl group. These alkyl groups can have a substituent, which can be as mentioned in the description of an alkylene group, preferably including those having an alkyl group such as a methyl group and an ethyl group, those having an alkoxy group and those having a hydroxy group.

Examples of an alkenyl group include a vinyl group, an allyl group, a methylvinyl group, a propenyl group, a butenyl group, a pentenyl group, a hexenyl group, a cyclopropenyl group, a cyclobutenyl group, a cyclopentenyl group and a cyclohexenyl group. These alkenyl groups can have a substituent, which can be as mentioned in the description of an alkylene group.

Examples of an alkynyl group include an ethynyl group, a propynyl group, a propargyl group, a butynyl group, a pentynyl group, a hexynyl group and a phenylethynyl group. These alkynyl groups can have a substituent, which can be as mentioned in the description of an alkylene group.

Examples of a cycloalkyl group include a cyclopropyl group, a cyclobutyl group, a cyclopentyl group, a cyclohexyl group, a cycloheptanyl group, a cyclooctanyl group, a cyclononanyl group, a cyclodecanyl group, a cycloundecanyl group and a cyclododecanyl group. These cycloalkyl groups can have a substituent, which can be as mentioned in the description of an alkylene group.

Examples of an aryl group include a phenyl group, a naphthyl group, an anthryl group and a phenanthryl group. These aryl groups can have a substituent, which can be as mentioned in the description of an alkylene group; or, for example, the alkyl group, the alkenyl group or the alkynyl group as described above.

Examples of an arylalkyl group include a benzyl group, a 4-methoxybenzyl group, a phenethyl group and a diphenylmethyl group. These arylalkyl groups can have a substituent, which can be as mentioned in the description of an alkylene group.

In the light of reactivity, $R^1$ in Formula (1) is preferably a hydrogen atom, an optionally substituted aliphatic hydrocarbon group or an optionally substituted alicyclic hydrocarbon group, more preferably a hydrogen atom or an optionally substituted aliphatic hydrocarbon group, further preferably a hydrogen atom. Among optionally substituted aliphatic hydrocarbon groups, an optionally substituted alkyl group is preferable as $R^1$, and the alkyl group has preferably 1 to 15, more preferably 1 to 10, further preferably 1 to 5 carbon atoms. Among alkyl groups, further preferred is at least one selected from the group consisting of a methyl group, an ethyl group, a propyl group, an isopropyl group, a butyl group, an isobutyl group, a sec-butyl group, a tert-butyl group, a pentyl group, an isopentyl group and a neopentyl group, and particularly preferred is at least one selected from the group consisting of a methyl group and an ethyl group. Among optionally substituted alicyclic hydrocarbon groups, an optionally substituted cycloalkyl group is preferable as $R^1$. Among cycloalkyl groups, preferred is at least one selected from the group consisting of a cyclopropyl group, a cyclobutyl group and a cyclopentyl group.

In the light of reactivity, $R^2$, $R^3$ and $R^4$ in Formula (1) are, independently of one another, preferably a hydrogen atom, an optionally substituted aliphatic hydrocarbon group or an optionally substituted alicyclic hydrocarbon group, independently of one another, more preferably a hydrogen atom or an optionally substituted aliphatic hydrocarbon group. Further preferably, $R^3$ and $R^4$ are a hydrogen atom. Among optionally substituted aliphatic hydrocarbon groups, an optionally substituted alkyl group is preferable as $R^2$, $R^3$ and $R^4$, and the alkyl group has preferably 1 to 15, more preferably 1 to 10, further preferably 1 to 5 carbon atoms. Among alkyl groups, further preferred is at least one selected from the group consisting of a methyl group, an ethyl group, a propyl group, an isopropyl group, a butyl group, an isobutyl group, a sec-butyl group, a tert-butyl group, a pentyl group, an isopentyl group and a neopentyl group, and particularly preferred are a methyl group, an ethyl group and a propyl group.

Among optionally substituted alicyclic hydrocarbon groups, an optionally substituted cycloalkyl group is preferable as $R^2$, $R^3$ and $R^4$. Among others, more preferred is at least one cycloalkyl group selected from the group consisting of a cyclopropyl group, a cyclobutyl group and a cyclopentyl group. In a preferable embodiment of the present invention, $R^2$, $R^3$ and $R^4$ in Formula (1) are a hydrogen atom.

In Formula (1), X, $R^1$, $R^2$, $R^3$ and $R^4$ can be combined in any manner to form a ring structure; for example, $R^2$ and $R^4$ are combined to form a ring structure where an olefin can be a part of the ring structure.

In the light of reactivity of an olefin and safety in production, it is essential that the total number of carbon atoms of X, $R^1$, $R^2$, $R^3$ and $R^4$ is 2 or more. In the light of placing an olefin distant from a main chain in order to make the olefin adequately reactive, the total number of carbon atoms described above is preferably 4 or more, more preferably 5 or more, further preferably 6 or more. The carbon number of X is preferably 3 or more, more preferably 4 or more. The total carbon number of 1 or less is undesirable because it means that the structure has a highly toxic fragment, possibly leading to insufficient handling safety in case of progress of, for example, decomposition. In the light of water-solubility, the total carbon number is preferably 15 or less, more preferably 11 or less, further preferably 9 or less, most preferably 7 or less. When the total carbon number is 15 or less, mutual interaction between side chains occurs in an aqueous solution, resulting in thickening or prevention of hydrous gel formation, which tends to allow for easy molding in a process such as coating. When the total carbon number is 7 or less, a highly transparent aqueous solution can be prepared, which can be suitably used for an application requiring transparency. X is preferably 9 or less, more preferably 7 or less.

A content of the structural unit represented by Formula (1) in a vinyl alcohol-based polymer having an olefin in side chain of the present invention is 0.001 to 10 mol % based on 100 mol % of the total structural units. With a content of the structural unit represented by Formula (1) within a range of 0.001 to 10 mol %, the polymer is highly stable during storage, highly soluble in water or an organic solvent even after thermal treatment and highly reactive to high energy beam. If a content of the structural unit represented by Formula (1) is less than 0.001 mol %, modification of a vinyl alcohol-based polymer by the structural unit represented by Formula (1) is insufficiently effective. If a content of the structural unit represented by Formula (1) is more than 10 mol %, crystallinity of a vinyl alcohol-based polymer tends to be deteriorated, so that water-resistance of the crosslinked coating is deteriorated and furthermore hydrophobization deteriorates water solubility. A content of the structural unit represented by Formula (1) is preferably 0.05 mol % or more, more preferably 0.1 mol % or more, particularly preferably 0.3 mol % or more. Furthermore, a content of the structural unit represented by Formula (1) is preferably 7 mol % or less, more preferably 5 mol % or less. A vinyl alcohol-based polymer having an olefin in side chain of the present invention can have one or two or more types of structural units represented by Formula (1). When the polymer has two or more types of the structural units, it is important that the total content of the two or more types of structural units is within the above range. A structural unit in a polymer herein refers to a repeating unit making up the polymer. For example, a vinyl alcohol unit or a vinyl ester unit as described below is a structural unit.

[Structural Unit Represented by Formula (2)]

A vinyl alcohol-based polymer having an olefin in side chain of the present invention preferably contains 0 to 10 mol % of the structural unit represented by Formula (2) based on the total structural units.

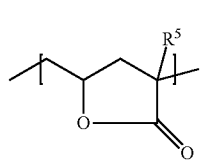

(2)

wherein $R^5$ represents a hydrogen atom or a methyl group.

In Formula (2), $R^5$ represents a hydrogen atom or a methyl group. $R^5$ is preferably a hydrogen atom in the light of easier synthesis of a vinyl alcohol-based polymer to which the structural unit represented by Formula (2) has been introduced [hereinafter, sometimes abbreviated as "lactone-containing vinyl alcohol-based polymer"].

In a vinyl alcohol-based polymer having an olefin in side chain of the present invention, a content of the structural unit represented by Formula (2) is preferably 0 to 10 mol % based on 100 mol % of the total structural units. With a content of the structural unit represented by Formula (2) being 10 mol % or less, crystallinity of a vinyl alcohol-based polymer tends not to be lowered and water-resistance of a crosslinked coating tends not to be lowered. It is more preferably 8 mol % or less, further preferably 7 mol % or less. Meanwhile, a content of the structural unit represented by Formula (2) is more preferably 0.005 mol % or more, further preferably 0.01 mol % or more, particularly preferably 0.1 mol % or more. A vinyl alcohol-based polymer having an olefin in side chain of the present invention can have one or two or more types of structural units represented by Formula (2). When the polymer has two or more types of the structural units, the total content of these structural units is preferably within the above range.

[Vinyl Alcohol Unit]

In the light of water solubility, a content of a vinyl alcohol unit in a vinyl alcohol-based polymer having an olefin in side chain of the present invention is, but not limited to, preferably 50 mol % or more, more preferably 70 mol % or more, further preferably 75 mol % or more, particularly preferably 80 mol % or more, based on 100 mol % of the total structural units in the polymer. A content of the vinyl alcohol unit is preferably 99.95 mol % or less, more preferably 99.90 mol % or less, based on 100 mol % of the total structural units in the polymer.

The vinyl alcohol unit can be derived from a vinyl ester unit by hydrolysis, alcoholysis or the like. Therefore, the vinyl ester unit may remain in the vinyl alcohol-based polymer, depending on the conditions of conversion of the vinyl ester unit into the vinyl alcohol unit. The vinyl alcohol-based polymer having an olefin in side chain of the present invention may, therefore, contain the above vinyl ester unit.

Examples of the vinyl ester unit include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Among these, vinyl acetate is industrially preferable.

A vinyl alcohol-based polymer having an olefin in side chain of the present invention is preferably represented by Formula (A):

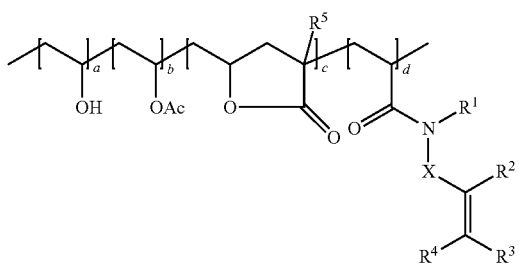

(A)

wherein X, $R^1$, $R^2$, $R^3$ and $R^4$ are as defined in Formula (1); $R^5$ is as defined in Formula (2); the total carbon number of X, $R^1$, $R^2$, $R^3$ and $R^4$ is 2 or more; a, b, c and d represent contents of the individual structural units based on the total structural units; a is 50 to 99.95 mol %, b 0.05 to 30 mol %, c is 0 to 10 mol %, and d is 0.001 to 10 mol %.

In Formula (A), a is preferably 50 to 99.95 mol % based on 100 mol % of the total structural units in the polymer. Then, a is more preferably 70 mol % or more, further preferably 75 mol % or more, particularly preferably 80 mol % or more. Meanwhile, a is more preferably 99.90 mol % or less.

In Formula (A), b is preferably 0.05 to 30 mol % based on 100 mol % of the total structural units in the polymer. Then, b is more preferably 0.1 mol % or more, further preferably 0.2 mol % or more, particularly preferably 0.5 mol % or more. Meanwhile, b is more preferably 25 mol % or less, further preferably 20 mol % or less.

In Formula (A), c is preferably 0 to 10 mol % based on 100 mol % of the total structural units in the polymer. Then, c is more preferably 0.005 mol % or more, further preferably 0.01 mol % or more, particularly preferably 0.1 mol % or more. Meanwhile, c is more preferably 8 mol % or less, further preferably 7 mol % or less.

In Formula (A), d is 0.001 to 10 mol % based on 100 mol % of the total structural units in the polymer. With d being within the range of 0.001 to 10 mol %, the polymer has good solubility in water or an organic solvent even after thermal treatment, excellent storage stability, and excellent reactivity to high energy beam. Then, d is preferably 0.05 mol % or more, more preferably 0.1 mol % or more, further preferably 0.3 mol % or more. Meanwhile, d is preferably 7 mol % or less, more preferably 5 mol % or less, based on 100 mol % of the total structural units in the polymer.

As long as the present invention is effective, the vinyl alcohol-based polymer having an olefin in side chain of the present invention can further contain a structural unit other than the structural unit represented by Formula (1), the structural unit represented by Formula (2), the vinyl alcohol unit and the vinyl ester unit. The structural unit can be copolymerized with, for example, a vinyl ester, and is a structural unit derived from an unsaturated monomer which can be converted into the structural unit represented by Formula (1), an ethylenic unsaturated monomer copolymerizable with a vinyl ester, or the like. Examples of an ethylenic unsaturated monomer include α-olefins such as ethylene, propylene, n-butene, isobutylene and 1-hexene, acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; acrylamide, N-methylacrylamide, N-ethylacrylamide, N,N-dimethylacrylamide, diacetone acrylamide, acrylamide propanesulfonic acid and salts thereof, acrylamide propyldimethylamine and salts thereof (for example, quaternary salts); methacrylamide, N-methyl methacrylamide, N-ethyl methacrylamide, methacrylamide propanesulfonic acid and salts thereof, methacrylamide propyldimethylamine and salts thereof (for example, quaternary salts); vinyl ethers such as methyl vinyl ether, ethyl vinyl ether, n-propyl vinyl ether, i-propyl vinyl ether, n-butyl vinyl ether, i-butyl vinyl ether, t-butyl vinyl ether, dodecyl vinyl ether, stearyl vinyl ether and 2,3-diacetoxy-1-vinyloxypropane; vinyl cyanides such as acrylonitrile and methacrylonitrile; vinyl halides such as vinyl chloride and vinyl fluoride; vinylidene halides such as vinylidene chloride and vinylidene fluoride; allyl compounds such as allyl acetate, 2,3-diacetoxy-1-allyloxypropane and allyl chloride; unsaturated dicarboxylic acids such as maleic acid, itaconic acid and fumaric acid, and salts or esters thereof; vinylsilyl compounds such as vinyltrimethoxysilane; and isopropenyl acetate.

There are no particular restrictions to the arrangement sequence of the structural units represented by Formula (1), the structural units represented by Formula (2), the vinyl alcohol unit and another optional structural unit in the vinyl alcohol-based polymer having an olefin in side chain of the present invention, and the vinyl alcohol-based polymer having an olefin in side chain of the present invention can be any of a random copolymer, a block copolymer, an alternating copolymer and the like.

A viscosity-average polymerization degree of the vinyl alcohol-based polymer having an olefin in side chain of the present invention as determined in accordance with JIS K6726 is, but not limited to, preferably 100 to 5,000, more preferably 200 to 4,000. With a viscosity-average polymerization degree being 100 or more, a film formed tends to have higher mechanical strength. A viscosity-average polymerization degree of 5,000 or less tends to allow for easier industrial production of the vinyl alcohol-based polymer having an olefin in side chain.

[Production Method]

There are no particular restrictions to a method for producing a vinyl alcohol-based polymer having an olefin in side chain of the present invention. Examples of such a method include a method comprising copolymerizing an unsaturated monomer having the structural unit represented by Formula (1) with a vinyl ester followed by hydrolysis or alcoholysis of the vinyl ester unit; a method comprising copolymerizing an unsaturated monomer convertible to the structural unit represented by Formula (1) with a vinyl ester followed by hydrolysis or alcoholysis of the vinyl ester unit while converting the structural unit convertible to the structural unit represented by Formula (1) into the structural unit represented by Formula (1); and a method comprising introducing a reaction point to a vinyl alcohol-based polymer and a subsequent reaction at the reaction point to introduce the structural unit represented by Formula (1). Particularly, the method comprising the subsequent reaction at the reaction point introduced into the vinyl alcohol-based polymer is preferable because of ease of production; for example, a method comprising dehydration condensation of an amine compound represented by Formula (3) to a vinyl alcohol-based polymer to which a carboxylic acid has been introduced. Furthermore, another example is a method comprising reacting a vinyl alcohol-based polymer to which a functional group reactive with an amine compound such as a vinyl alcohol-based polymer to which a carboxylic acid ester has been introduced, a vinyl alcohol-based polymer to which a carboxylic acid halide has been introduced, a vinyl alcohol-based polymer to which a carboxylic acid anhydride has been introduced, and a vinyl alcohol-based polymer to which a lactone ring has been introduced, with an amine compound represented by Formula (3). Particularly, a method comprising reacting a vinyl alcohol-based polymer to which a structural unit represented by Formula (2) has been introduced, with an amine compound represented by Formula (3), is a more preferable aspect because of a relatively higher reaction efficiency.

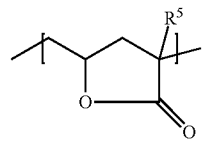

(2)

wherein $R^5$ represents a hydrogen atom or a methyl group.

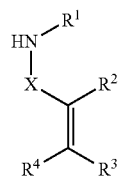

(3)

wherein, X, $R^1$, $R^2$, $R^3$ and $R^4$ are as defined in Formula (1).

There are no particular restrictions to an olefin-containing amine compound represented by Formula (3) as long as the total carbon number of X, $R^1$, $R^2$, $R^3$ and $R^4$ is 2 or more. An amine with the total carbon number of 1 or less is so toxic that handling the amine is quite hard to handle and thus cannot be used. Examples of an olefin-containing amine compound in which the total carbon number of X, $R^1$, $R^2$, $R^3$ and $R^4$ is 2 or more include olefin-containing primary amine compounds and salts thereof such as 3-butenylamine, 4-pentenylamine, 5-hexenylamine, 6-heptenylamine, 7-octenylamine, 8-nonenylamine, 9-decenylamine, 10-undecenylamine, 10-oleylamine, 2-methylallylamine, 4-aminostyrene, 4-vinylbenzylamine, 2-allylglycine, S-allylcysteine, α-allylalanine, 2-allylaniline, geranylamine, vigabatrin, 4-vinylaniline and 4-vinyloxyaniline; and olefin-containing secondary amine compounds and salts thereof such as diallylamine, N-methylallylamine, N-allyl-N-isopropylamine, N-allyl-N-tert-butylamine, N-allylaniline, N-allylbenzylamine and N-allylpiperazine. Among others, an olefin-containing primary amine compound is more preferable in the light of reactivity.

Among the olefin-containing amine compounds represented by Formula (3), preferred are 3-butenylamine, 4-pentenylamine, 5-hexenylamine, 6-heptenylamine, 7-octenylamine, 8-nonenylamine, 9-decenylamine, 10-undecenylamine, oleylamine, 2-methylallylamine, 4-aminostyrene, 4-vinylbenzylamine, 2-allylglycine, S-allylcysteine, α-allylalanine, 2-allylaniline, geranylamine, vigabatrin, 4-vinylaniline and 4-vinyloxyaniline; more preferred are 3-butenylamine, 4-pentenylamine, 5-hexenylamine, 6-heptenylamine, 7-octenylamine, 8-nonenylamine, 9-decenylamine, 10-undecenylamine, oleylamine, 2-methylallylamine, 4-aminostyrene, 4-vinylbenzylamine, 2-allylaniline, 4-vinylaniline and 4-vinyloxyaniline; further preferred are 3-butenylamine, 4-pentenylamine, 5-hexenylamine, 6-heptenylamine, 7-octenylamine, 8-nonenylamine, 9-decenylamine, 10-undecenylamine and 2-methylallylamine; most preferred are 5-hexenylamine, 6-heptenylamine, 7-octenylamine and 8-nonenylamine.

There are no particular restrictions to a method for producing a lactone-containing vinyl alcohol-based polymer. Examples of such a method include a method comprising copolymerizing a vinyl ester with an unsaturated monomer having a structural unit represented by Formula (2) [hereinafter, sometimes abbreviated as "lactone-ring unit"]; and a method comprising copolymerizing a vinyl ester with an unsaturated monomer convertible to a lactone-ring unit. In particular, a method comprising copolymerizing a vinyl ester with an unsaturated monomer convertible to a lactone-ring unit is preferable because of ease of production. A more specific example is a method comprising copolymerizing a vinyl ester with an unsaturated monomer convertible to a lactone-ring unit; and converting the vinyl ester unit in the copolymer obtained into a vinyl alcohol unit while converting a unit derived from an unsaturated monomer convertible to a lactone-ring unit into a lactone-ring unit. Particularly, a convenient and preferable method is a method comprising copolymerizing a vinyl ester with a carboxylic acid derivative having an unsaturated double bond followed by hydrolysis or alcoholysis an ester bond in the vinyl ester unit in the copolymer obtained, while being condensed with the carboxylic acid derivative moiety.

Preferable examples of a carboxylic acid derivative having an unsaturated double bond include a carboxylic acid having an unsaturated double bond and a salt thereof, a carboxylic acid ester having an unsaturated double bond, a carboxylic acid halide having an unsaturated double bond, and a carboxylic acid anhydride having an unsaturated double bond, and more preferred are a carboxylic acids having an unsaturated double bond and a salt thereof, and a carboxylic acid ester having an unsaturated double bond. Preferable examples of a carboxylic acid having an unsaturated double bond and a salt thereof, and a carboxylic acid ester having an unsaturated double bond include at least one selected from the group consisting of acrylic acid and salts thereof; acrylic acid esters such as methyl acrylate, ethyl acrylate, n-propyl acrylate, i-propyl acrylate, n-butyl acrylate, i-butyl acrylate, t-butyl acrylate, 2-ethylhexyl acrylate, dodecyl acrylate and octadecyl acrylate; methacrylic acid and salts thereof; methacrylic acid esters such as methyl methacrylate, ethyl methacrylate, n-propyl methacrylate, i-propyl methacrylate, n-butyl methacrylate, i-butyl methacrylate, t-butyl methacrylate, 2-ethylhexyl methacrylate, dodecyl methacrylate and octadecyl methacrylate; and an unsaturated dicarboxylic acid such as maleic acid, itaconic acid and fumaric acid, and a salt or ester thereof.

There are no particular restrictions to a copolymerization method in the step of copolymerizing a vinyl ester with an unsaturated monomer convertible to a lactone-ring unit [hereinafter, sometimes simply abbreviated as "copolymerization process"], and a conventionally known method such as bulk polymerization, solution polymerization, suspension polymerization, emulsion polymerization and dispersion polymerization can be employed. From the industrial point of view, preferred are solution polymerization, emulsion polymerization and dispersion polymerization. Polymerization can be carried out by any style of batch polymerization, semi-batch polymerization and continuous polymerization.

For example, in solution polymerization, a solvent is preferably an alcohol such as methanol, ethanol and isopropanol; a hydrocarbon such as hexane and heptane; or water. Among these, an alcohol is preferable, and it is more preferably methanol or ethanol, further preferably methanol. There are no particular restrictions to the amount of a solvent, but in the light of productivity and the like, the amount of a solvent is preferably 1000 parts by mass or less, more preferably 200 parts by mass, based on 100 parts by mass of a vinyl ester. The amount of a solvent is preferably 5 parts by mass or more based on 100 parts by mass of a vinyl ester.

Examples of a polymerization initiator in the copolymerization process include an azo polymerization initiator such as 2,2'-azobisisobutyronitrile, 2,2'-azobis(2,4-dimethylvaleronitrile) and a peroxide polymerization initiator such as 2,2'-azobis(4-methoxy-2,4-dimethylvaleronitrile); benzoyl peroxide and n-propyl peroxycarbonate. Among these, an azo polymerization initiator is preferable and 2,2'-azobisisobutyronitrile is more preferable.

The amount of a polymerization initiator is, but not limited to, preferably 0.001 to 10 parts by mass, more preferably 0.01 to 1 part by mass based on 100 parts by mass of the total amount of a vinyl ester and an unsaturated monomer convertible to a lactone-ring unit.

The copolymerization process can involve an additional monomer, in addition to the vinyl ester and the unsaturated monomer convertible to a lactone-ring unit. Such an additional monomer can be a monomer described above giving another structural unit which the above vinyl alcohol unit can contain.

The amount of an unsaturated monomer convertible to a lactone-ring unit can be appropriately determined, depending on a content of a desired lactone-ring unit, the type of the unsaturated monomer convertible to a lactone-ring unit or the like. The amount of an unsaturated monomer convertible to a lactone-ring unit is preferably 0.1 to 10 mol %, more preferably 0.5 to 7 mol % based on the total molar number of monomers used in the copolymerization process.

In the copolymerization process, a chain transfer agent can be involved for the purpose of adjusting a polymerization degree of a lactone-containing vinyl alcohol-based polymer obtained or the like. Examples of a chain transfer agent include an aldehyde such as acetaldehyde, propionaldehyde, butylaldehyde and benzaldehyde; a ketone such as acetone, methyl ethyl ketone, hexanone and cyclohexanone; a mercaptan such as 2-hydroxyethanethiol and dodecyl mercaptan; and a halogenated hydrocarbon such as trichloroethylene and perchloroethylene. Among these, an aldehyde and a ketone are preferably used. The amount of a chain transfer agent can be appropriately determined, depending on a chain transfer constant of the chain transfer agent used, a polymerization degree of a desired lactone-containing vinyl alcohol-based polymer and the like. Generally, it is preferably 0.1 to 10% by mass based on the total mass of the vinyl ester and the unsaturated monomer convertible to a lactone-ring unit.

Furthermore, a thiol such as thiolacetic acid and mercaptopropionic acid can be involved in the copolymerization process, to modify an end of a lactone-containing vinyl alcohol-based polymer and finally an end of a vinyl alcohol-based polymer having an olefin in side chain.

A polymerization temperature in the copolymerization process can be appropriately determined, depending on the type of a polymerization initiator and properties of a desired copolymer, and it is preferably 0 to 100° C., more preferably 40 to 80° C.

The atmosphere of the copolymerization process is preferably inert; for example, nitrogen gas atmosphere and argon gas atmosphere.

A polymer at the end of the reaction can be collected in accordance with a known method. For example, it can be collected by fractional precipitation using a precipitating agent such as acetone, hexane and heptane.

A vinyl ester unit in a copolymer of a vinyl ester and an unsaturated monomer convertible to a lactone-ring unit can be converted into a vinyl alcohol unit by hydrolysis or alcoholysis while condensing it with a carboxylic acid derivative moiety in the unsaturated monomer convertible to a lactone-ring unit, giving a lactone-containing vinyl alcohol-based polymer. Specifically, for example, the copolymer is in contact with an acidic or alkaline substance, that is, saponification, and then dried, to convert some or all of the carboxylic acid derivative moieties introduced, into a lactone ring by condensation with adjacent hydroxyl groups. The saponification process and the drying process can be conducted in accordance with a known method for producing a polyvinyl alcohol.

The saponification process can be conducted, for example, by dissolving the copolymer in a solvent containing water and/or an alcohol and adding an acidic or alkaline substance. Here, a solvent such as tetrahydrofuran, dioxane, dimethylsulfoxide, diethyleneglycol dimethyl ether, toluene and acetone can be combined for the purpose of improving solubility of the copolymer and the acidic or alkaline substance. Particularly, in the light of ease of producing a lactone-containing vinyl alcohol-based polymer, it is preferable that a saponification process in which an alkaline substance is added is employed. When water and/or an alcohol is used as a solvent in the above copolymerization process, a reaction solution of the copolymerization process as it is can be used as a solution in the saponification process.

Examples of an alcohol used in dissolving a copolymer include methanol, ethanol, n-propanol, isopropanol, n-butanol, ethyleneglycol. Among alcohols, alcohols having 1 to 4 carbon atoms is preferable and methanol is more preferable.

The amount of a solvent (the total amount of solvents used) is, but not limited to, preferably 1 to 50 parts by mass, more preferably 2 to 10 parts by mass based on one part of the copolymer.

Acidic substances which can be used in the saponification process include p-toluenesulfonic acid. Alkaline substances which can be used in saponification include an alkali metal hydroxide such as sodium hydroxide and potassium hydroxide; and an alkali metal alkoxylate such as sodium methylate. The amount of the acidic or alkaline substance is preferably 0.0001 to 2 mol, more preferably 0.001 to 1.2 mol based on one mol % of a vinyl ester unit in a copolymer.

A reaction temperature in the saponification process is preferably 0 to 180° C., more preferably 20 to 80° C. A reaction time is preferably 0.01 to 20 hours, more preferably 0.1 to 3 hours, depending on a reaction rate.

Depending on the type of a solvent used, a particulate saponified material often precipitates as the reaction proceeds. At the end of the reaction, the precipitated saponified material can be collected by a known method. For example, precipitated particles can be separated by filtration, washed with an alcohol such as methanol and dried, and then a lactone-containing vinyl alcohol-based polymer can be collected.

There are no particular restrictions to a method for reacting an olefin-containing amine compound represented by Formula (3) with a lactone-containing vinyl alcohol-based polymer, which can be selected, depending on required properties for a desired vinyl alcohol-based polymer having an olefin in side chain. Examples include a method comprising blending an olefin-containing amine compound represented by Formula (3) in a molten lactone-containing vinyl alcohol-based polymer and reacting these; a method comprising reacting these in a solvent which can dissolve an olefin-containing amine compound represented by Formula (3) and cannot dissolve a lactone-containing vinyl alcohol-based polymer, that is, in a slurry state; reacting these in a solid state, that is, as a lactone-containing vinyl alcohol-based polymer impregnated with an olefin-containing amine compound represented by Formula (3); a method comprising reacting these by contacting a lactone-containing vinyl alcohol-based polymer with a vaporized olefin-containing amine compound; and a method comprising reacting a lactone-containing vinyl alcohol-based polymer and an olefin-containing amine compound represented by Formula (3) in a solution state in which all of these are homogeneously dissolved. A suitable procedure can be appropriately selected, taking reactivity and/or isolation properties of a vinyl alcohol-based polymer having an olefin in side chain into consideration.

When a lactone-containing vinyl alcohol-based polymer and an olefin-containing amine compound represented by Formula (3) are reacted in a slurry or homogeneous solution state, a concentration of the lactone-containing vinyl alcohol-based polymer during the reaction is, but not limited to, preferably 1% by mass to 50% by mass, more preferably 2% by mass to 40% by mass, further preferably 3% by mass to 30% by mass. When the concentration is 1% by mass or more, reduction of a reaction rate due to a low concentration of a lactone-containing vinyl alcohol-based polymer can be easily prevented. When the concentration is 50% by mass or less, insufficient stirring is probably prevented.

Examples of a solvent used in the reaction of a lactone-containing vinyl alcohol-based polymer with an olefin-containing amine compound represented by Formula (3) include, but not limited to, water; an alcohol such as methanol, ethanol, n-propanol, isopropanol, n-butanol, isobutanol, sec-butanol and tert-butanol; an aliphatic or alicyclic hydrocarbon such as n-hexane, n-pentane and cyclohexane; an aromatic hydrocarbon such as benzene and toluene; an aliphatic or aromatic halide such as chloroform, chlorobenzene and dichlorobenzene; a nitrile such as acetonitrile and benzonitrile; an ether such as diethyl ether, diphenyl ether, anisole, 1,2-dimethoxyethane and 1,4-dioxane; a ketone such as acetone, methyl isopropyl ketone and methyl isobutyl ketone; an ester such as ethyl acetate and ethyl propionate; an N-alkyllactam such as N-methyl-2-pyrrolidone; an N,N-dialkylamide such as N,N-dimethylformamide and N,N-dimethylacetamide; a sulfoxide such as dimethylsulfoxide; and a sulfolane such as sulfolane. Alternatively, an olefin-containing amine compound represented by Formula (3) can be used as a substrate and a solvent. Among these, in the light of reactivity, preferred are an alcohol, an aliphatic or alicyclic hydrocarbon, an aromatic hydrocarbon, an ether, a ketone, and an olefin-containing amine compound represented by Formula (3). The solvent can be a combination of two or more; for example, in a slurry reaction, a solvent which does not dissolve a lactone-containing vinyl alcohol-based polymer can be combined with a solvent with which a lactone-containing vinyl alcohol-based polymer swells such as an N,N-dialkyllactam and a sulfoxide.

A temperature in a reaction of a lactone-containing vinyl alcohol-based polymer with an olefin-containing amine compound represented by Formula (3) is, but not limited to, preferably 20 to 150° C., more preferably 30 to 140° C., further preferably 40 to 130° C., most preferably 50 to 120° C. in the light of reactivity. A reaction system can be, if necessary, under pressure or reduced pressure.

There are no particular restrictions to a method for collecting a vinyl alcohol-based polymer having an olefin in side chain after reacting a lactone-containing vinyl alcohol-based polymer with an olefin-containing amine compound represented by Formula (3), and it can be collected by a known method. For example, in a homogeneous reaction where a lactone-containing vinyl alcohol-based polymer dissolved in a solvent is reacted, a reaction solution can be added to a solvent which does not dissolve a lactone-containing vinyl alcohol-based polymer or a vinyl alcohol-based polymer having an olefin in side chain (poor solvent) to precipitate the polymer, which is then collected. Here, using a mixer, the reaction solution and the poor solvent are blended while a precipitated resin is cut, giving a slurry, or the polymer can be removed as a fiber using a wet spinning apparatus or a dry spinning apparatus. Alternatively, pulverization by spray drying, casting or film forming by extrusion from a die can be employed. The removed resin can be washed with an organic solvent or water which does not dissolve the resin, and can be dried by a fan dryer or the like. When the reaction is conducted in a slurry or solid state where a lactone-containing vinyl alcohol-based polymer is not dissolved, a resin can be separated, after the reaction, by solid-liquid separation by means of filtration, centrifugal drainage, drying or the like. The separated resin can be washed with an organic solvent or water which does not dissolve the resin, or dried by a fan dryer or the like. When a vaporized olefin-containing amine compound represented by Formula (3) is reacted with a lactone-containing vinyl alcohol-based polymer, the atmosphere can be replaced by a gas such as the air, nitrogen and argon, to remove the olefin-containing amine compound.

[Vinyl Alcohol-Based Polymer Having an Olefin in Side Chain]

A vinyl alcohol-based polymer having an olefin in side chain obtained by the present invention can have another functional group as long as it has an olefin in side chain. For example, an olefin-containing amine compound represented by Formula (3) can be added to a lactone-containing vinyl alcohol-based polymer to introduce a particular structure containing an olefin in side chain, and the lactone-containing vinyl alcohol-based polymer can be reacted with an acid, an alkali or an amine compound having another functional group to introduce various functional groups. Examples include introduction of a carboxylic acid group by a reaction with an acid compound such as hydrochloric acid and carbonic acid; introduction of a carboxylic acid base by a reaction with an alkaline metal compound such as sodium hydroxide and potassium hydroxide; introduction of an amide group by a reaction with ammonia; introduction of an alkyl group by a reaction with an alkylamine compound; introduction of an alkynyl group by a reaction with an alkynylamine compound; introduction of an aryl group by a reaction with an arylamine compound; introduction of a hydroxy group by a reaction with an amine compound having a hydroxy group; introduction of a silyl group by a reaction with an amine compound having a silyl group; introduction of a furyl group by a reaction with an amine compound having a furyl group; introduction of a thiol group by a reaction with an amine compound having a thiol group; and introduction of an amino group by a reaction with an amine compound having two or more intramolecular amino groups.

Utilizing its properties, a vinyl alcohol-based polymer having an olefin in side chain of the present invention alone or as a composition containing other components can be used for various applications of a vinyl alcohol-based polymer, in accordance with a known method such as molding, spinning and emulsification. It can be, for example, used for a surfactant for various applications; a paper modifier such as a paper coating agent, an internal additive and a pigment binder; an adhesive for a wood, a paper, an aluminum foil and an inorganic material; a binder for nonwoven fabric; a paint; a warp sizing agent; a fiber finishing agent; a sizing agent for hydrophobic fiber such as polyester; various other films; a sheet; a bottle; a fiber; a thicker; an aggregating agent; a soil modifier; and hydrogel.

As long as the effects of the present invention are not inhibited, an additive can be optionally, if necessary, added to a vinyl alcohol-based polymer having an olefin in side chain of the present invention, including a filler, a processing stabilizer such as a copper compound, a weather-resistance stabilizer, a colorant, an ultraviolet absorber, a light stabilizer, an antioxidant, an antistatic agent, a flame retardant, a plasticizer, another thermoplastic resin, a lubricant, a flavor, a defoaming agent, a deodorant, an extender, a release agent, a mold release, a reinforcing agent, an antifungal agent, an antiseptic and a crystallization retarding agent.

EXAMPLES

There will be detailed the present invention with reference to Examples, but the present invention is not limited to these examples at all. Unless otherwise indicated, "%" and "part(s)" in Examples and Comparative Examples denote "% by mass" and "part(s) by mass", respectively.

[Calculation of a Modification Rate]

Using a nuclear magnetic resonance spectrometer "LAMBDA 500" from JEOL Ltd., $^1$H-NMR analysis of a vinyl alcohol-based polymer having an olefin in side chain was conducted at room temperature, and a modification rate was calculated from an integrated value of a peak derived from an amide proton (7.6 to 7.7 ppm) or an olefin proton (5.0 to 7.5 ppm). For example, in Example 1, a modification rate was calculated from an integrated value of a peak derived from an olefin proton at 5.75 ppm. Here, the above modification rate corresponds to a content of the structural unit represented by Formula (1) based on the total structural units constituting a vinyl alcohol-based polymer having an olefin in side chain. Here, in order to make the structure of a target product clearer, NMR analysis can be conducted in combination with analysis under various temperature conditions and for various nuclear species or analysis using an additive.

[Evaluation of Water Solubility]

A vinyl alcohol-based polymer obtained in any of Examples and Comparative Examples was subjected to thermal treatment in a hot-air oven at 150° C. for 6 hours. Then, 2 g of the vinyl alcohol-based polymer was added to 100 g of ion-exchanged water at room temperature (25° C.), and the mixture was heated to 100° C. at a rate of 10° C./min with stirring (150 rpm) and stirred at 100° C. When the vinyl alcohol-based polymer was completely dissolved, heating was stopped and the mixture was allowed to be cooled to room temperature (25° C.). Powder made of the final vinyl alcohol-based polymer was evaluated according to the following criteria.

A: the powder was completely dissolved within 120 min after it was heated to 100° C., and one day after cooling, the dissolved state was maintained.

B: the powder was dissolved in 120 min after it was heated to 100° C., but the resulting aqueous solution became cloudy.

C: the powder was not completely dissolved in 120 min after it was heated to 100° C.

[Evaluation of Water Resistance of a Film]

One part by mass of 2-Hydroxy-4'-(2-hydroxyethoxy)-2-methylpropiophenone as a photo initiator was added to and dissolved in an aqueous solution of a vinyl alcohol-based polymer obtained in any of Examples and Comparative Examples (concentration: 5% by mass) based on 100 parts by mass of the vinyl alcohol-based polymer, to prepare a coating solution. The coating solution was cast on a 15 cm×15 cm mold formed by folding the corners of a polyethylene terephthalate film, followed by fully evaporating the solvent at room temperature under atmospheric pressure, to provide a film with a thickness of about 100 μm. The film was irradiated with UV at an intensity of 120 J/cm², to prepare a film for evaluation. The film for evaluation was immersed in a boiling water for one hour, removed from the water bath, and dried in vacuo at 40° C. for 12 hours, followed by measuring its mass (W1). From the mass (W1) and a mass before immersion (W2), an elution rate under boiling conditions was calculated in accordance with the equation below. The elution rate was used as a measure for water resistance after crosslinking. When a film for evaluation was dissolved in water during immersion, it was evaluated as "unmeasurable".

Elution rate (% by mass)=100×([W2]−[W1])/[W2]

Synthetic Example 1

In a reaction vessel equipped with a stirrer, a reflux condenser, a nitrogen inlet tube, a dropping funnel and an inlet for a reaction substrate were charged 640 parts by mass of vinyl acetate, 254 parts by mass of methanol, and 1.05 parts by mass of methyl acrylate, and the system atmosphere was substituted with nitrogen by bubbling nitrogen for 30 min. Separately, a solution of methyl acrylate in methanol (concentration: 20% by mass) was prepared as a comonomer solution for consecutive addition, followed by nitrogen bubbling. The reaction vessel was heated to an internal temperature of 60° C., and then 0.06 parts by mass of 2,2'-azobisisobutyronitrile was added and polymerization was initiated at 60° C. During the polymerization reaction, a monomer composition in the polymerization solution (a molar ratio of vinyl acetate to methyl acrylate) was kept constant by adding dropwise the above solution of methyl acrylate in methanol to the system. When a polymerization rate of vinyl acetate reached 30 mol %, the polymerization was terminated, and the unreacted vinyl acetate monomer was removed out of the system, to give a solution of a copolymer in methanol.

To the solution of a copolymer in methanol thus obtained was further added methanol to such an amount that a concentration of the copolymer became 10% by mass. Subsequently, while a temperature was kept 60° C., a 10% by mass solution of sodium hydroxide in methanol was added to a ratio of 10 mmol of sodium hydroxide to one mole of the vinyl acetate unit in the copolymer, and saponification was conducted for 2 hours. As the saponification proceeded, a saponification product precipitated. After the alkaline solution was neutralized by adding methyl acetate, the particulate saponification product was separated from the solution and washed well with methanol, and then dried in a hot air dryer at 50° C. for 12 hours, to give a copolymer.

The copolymer thus obtained was analyzed by ¹H-NMR, and it was found that the copolymer was a lactone-containing vinyl alcohol-based polymer where 5 mol % of a structure represented by Formula (2) in which R⁵ is a hydrogen atom based on a molar number of the total structural units was introduced. A proportion of a molar number of the vinyl alcohol unit to the total molar number of the vinyl alcohol unit and the vinyl acetate unit in the lactone-containing vinyl alcohol-based polymer was 99 mol % or more. For the polymer obtained, a polymerization degree was calculated from a limiting viscosity [η] (unit: deciliter/g) as measured in water at 30° C. by the following equation, and was 1700.

Polymerization degree=([η]×10³/8.29)$^{(1/10.62)}$

Example 1

In a reaction vessel equipped with a stirrer and an inlet for a reaction substrate was charged 100 parts by mass of the lactone-containing vinyl alcohol-based polymer obtained in Synthetic Example 1. Then, 300 parts by mass of methanol and 39.8 parts by mass of 4-pentenylamine (Aldrich, JWP00285) were added and mixed, and the resulting mixture was heated to 60° C. with stirring while vacuuming the reaction vessel until methanol was completely evaporated. After evaporation of methanol, the mixture was warmed to 90° C., and stirred for 10 hours. Then, the mixture was allowed to be cooled to room temperature. Next, to the reaction vessel was charged 1000 parts by mass of methanol, and the mixture was stirred at room temperature for 30 min, and then the solution was filtrated. The above procedure was repeated twice, and the mixture was dried in vacuo at 40° C. for 12 hours, to give a target vinyl alcohol-based polymer having an olefin in side chain. It was found that the polymer contained 1.0 mol % of a structural unit where in Formula (1), R¹, R², R³ and R⁴ is a hydrogen atom and X is a propylene group. A vinyl alcohol unit was 94.5 mol %; a vinyl ester unit was 0.5 mol %; and the structural unit represented by Formula (2) was 4.0 mol %. The results of physical properties are shown in Table 1.

Example 2

Into a reaction vessel equipped with a stirrer, a reflux condenser and an inlet for a reaction substrate was charged 100 parts by mass of the lactone-containing vinyl alcohol-based polymer obtained in Synthetic Example 1. Then, 400 parts by mass of methanol and 69.3 parts by mass of 7-octenylamine were mixed and added, and the resulting mixture was heated to 66° C. and then stirred for 15 hours. Then, the reaction solution was filtrated and the resin obtained was transferred to the reaction vessel. To the vessel was added 1000 parts by mass of methanol, and the mixture was stirred at room temperature for 30 min, and the solution was filtrated. This procedure was repeated twice, and the mixture was dried in vacuo at 40° C. for 12 hours, to give a target vinyl alcohol-based polymer having an olefin in side chain. Here, 7-octenylamine was synthesized as described in a non-patent reference, Bioorganic and Medicinal Chemistry, Vol. 14, p. 2204 (2006). The vinyl alcohol-based polymer having an olefin in side chain thus obtained was analyzed by ¹H-NMR, and it was found that the polymer contained 1.8 mol % of a structural unit where in Formula (1), R¹, R², R³ and R⁴ is a hydrogen atom and X is a hexylene group. A vinyl alcohol unit was 94.5 mol %; a vinyl ester unit was 0.5 mol %; and the structural unit represented by Formula (2) was 3.2 mol %. The results of physical properties are shown in Table 1.

Example 3

Into a reaction vessel equipped with a stirrer, a reflux condenser and an inlet for a reaction substrate were charged 100 parts by mass of the lactone-containing vinyl alcohol-based polymer obtained in Synthetic Example 1 and 400 parts by mass of dimethylsulfoxide, to prepare a 20% by mass solution. To the solution was added 13.9 parts by mass of 7-octenylamine, and the mixture was heated to 120° C. and stirred for 5 hours. Then, the solution was added dropwise to methanol to isolate a polymer, which was then dried in vacuo at 40° C. for 12 hours, to give a target vinyl alcohol-based polymer having an olefin in side chain. It was found that the polymer contained 0.9 mol % of a structural unit where in Formula (1), $R^1$, $R^2$, $R^3$ and $R^4$ is a hydrogen atom and X is a hexylene group. A vinyl alcohol unit was 94.5 mol %; a vinyl ester unit was 0.5 mol %; and the structural unit represented by Formula (2) was 4.1 mol %. The results of physical properties are shown in Table 1.

Example 4

A reaction, work-up and analysis were conducted as described in Example 2, except that methanol was replaced by 300 parts by mass of 1,4-dioxane, an amine compound was 3.9 parts by mass of 3-butenylamine (Aldrich, CDS021978-100MG) in place of 7-octenylamine, a reaction temperature was 70° C. and a reaction time was 3 hours. It was found that the polymer contained 0.2 mol % of a structural unit where in Formula (1), $R^1$, $R^2$, $R^3$ and $R^4$ is a hydrogen atom and X is an ethylene group. A vinyl alcohol unit was 94.5 mol %; a vinyl ester unit was 0.5 mol %; and the structural unit represented by Formula (2) was 4.8 mol %. The results of physical properties are shown in Table 1.

Example 5

Into a reaction vessel equipped with a stirrer and an inlet for a reaction substrate was charged 100 parts by mass of the lactone-containing vinyl alcohol-based polymer obtained in Synthetic Example 1, and was heated to 120° C. Gaseous 2-methylallylamine (Tokyo Chemical Industry Co., Ltd., M2726) vaporized and heated to 120° C. by a vaporizer was blown into the vessel for reaction at a rate of 15.6 parts by mass/hr for 15 hours. Subsequently, a 100-fold reaction-vessel volume of nitrogen gas was introduced to remove 2-methylallylamine in the reaction vessel. The resulting resin was added to 1000 parts by mass of methanol, and the mixture was stirred at room temperature for 30 min, and the solution was filtrated. The procedure was repeated twice and the product was dried in vacuo at 40° C. for 12 hours, to give a target vinyl alcohol-based polymer having an olefin in side chain. It was found that the polymer contained 1.2 mol % of a structural unit where in Formula (1), $R^1$, $R^2$, $R^3$ and $R^4$ is a hydrogen atom, X is a methylene group and $R^2$ is methyl group. A vinyl alcohol unit was 94.5 mol %; a vinyl ester unit was 0.5 mol %; and the structural unit represented by Formula (2) was 3.8 mol %. The results of physical properties are shown in Table 1.

Example 6

A reaction, work-up and analysis were conducted as described in Example 2, except that 300 parts by mass of methanol was used, an amine compound was 73.8 parts by mass of 10-undecenylamine in place of 7-octenylamine, and a reaction time was 20 hours. Here, 10-undecenylamine was synthesized as described in a non-patent reference, Journal of Organic Chemistry, Vol. 52, p. 2495 (1987). It was found that the polymer contained 1.4 mol % of a structural unit where in Formula (1), $R^1$, $R^2$, $R^3$ and $R^4$ is a hydrogen atom and X is a nonylene group. A vinyl alcohol unit was 94.5 mol %; a vinyl ester unit was 0.5 mol %; and the structural unit represented by Formula (2) was 3.6 mol %. The results of physical properties are shown in Table 1.

Example 7

Into a reaction vessel equipped with a stirrer, a reflux condenser and an inlet for a reaction substrate were charged 10 parts by mass of the vinyl alcohol-based polymer having an olefin in side chain obtained in Example 2 and 30 parts by mass of methanol, and to the mixture was added 6.3 parts by mass of a 2N aqueous solution of sodium hydroxide. The mixture was stirred at 25° C. for one hour. Then, a resin was collected by filtration and dried in vacuo 40° C. for 12 hours, to give a target vinyl alcohol-based polymer having an olefin in side chain. The vinyl alcohol-based polymer having an olefin in side chain thus obtained was analyzed by $^1$H-NMR, and it was found that the polymer contained 1.8 mol % of a structural unit where in Formula (1), $R^1$, $R^2$, $R^3$ and $R^4$ is a hydrogen atom and X is a hexylene group. A vinyl alcohol unit was 94.5 mol %; a vinyl ester unit was 0.5 mol %; and the structural unit represented by Formula (2) was absent. The polymer contained 3.2 mol % of sodium carboxylate group formed by ring-opening of the lactone ring. The results of physical properties are shown in Table 1.

Comparative Example 1

In the lactone-containing vinyl alcohol-based polymer obtained in Synthetic Example 1, the structural unit represented by Formula (1) was 0 mol %, a vinyl alcohol unit was 94.5 mol %, a vinyl ester unit was 0.5 mol %, and the structural unit represented by Formula (2) was 5.0 mol %. The results of physical properties are shown in Table 1.

Comparative Example 2

A polyvinyl alcohol modified with a methacrylamide group in side chain was obtained as described in Example 1 in JP 2001-72720A. A modification rate of the methacrylamide group was 4.3 mol %. The structural unit represented by Formula (1) was 0 mol %, a vinyl alcohol unit was 95.6 mol %, a vinyl ester unit was 0.1 mol %, and the structural unit represented by Formula (2) was 0 mol %. The results of physical properties are shown in Table 1.

TABLE 1

| Unit | Modifying agent Amine compound — | Reaction Charge eq./lactone | Reaction solvent — | Concen- tration wt % | Reaction temperature ° C. | Reaction time h | Modification rate mol % | Amount of a lactone ring mol % | Water solubility — | Water resistance (elution rate) wt % |
|---|---|---|---|---|---|---|---|---|---|---|
| Example 1 | 4-Pentenylamine | 3 | None | 100 | 90 | 10 | 1.0 | 4.0 | A | 41.5 |
| Example 2 | 7-Octenylamine | 5 | MeOH | 20 | 66 | 15 | 1.8 | 3.2 | A | 13.2 |
| Example 3 | 7-Octenylamine | 1 | DMSO | 20 | 120 | 5 | 0.9 | 4.1 | A | 22.5 |
| Example 4 | 3-Butenylamine | 0.5 | 1,4-dioxane | 25 | 70 | 3 | 0.2 | 4.8 | A | 70.2 |

TABLE 1-continued

| | Modifying agent | | Reaction solvent | Concentration wt % | Reaction temperature ° C. | Reaction time h | Modification rate mol % | Amount of a lactone ring mol % | Water solubility | Water resistance (elution rate) wt % |
|---|---|---|---|---|---|---|---|---|---|---|
| Unit | Amine compound | Charge eq./lactone | | | | | | | | |
| Example 5 | 2-Methylallylamine | 30 | None | 100 | 120 | 15 | 1.2 | 3.8 | A | 53.2 |
| Example 6 | 10-Undecenylamine | 4 | MeOH | 25 | 66 | 20 | 1.4 | 3.6 | B | 13.5 |
| Example 7 | Reaction of a vinyl alcohol-based polymer containing an olefin in side chain obtained in Example 2 with sodium hydroxide | | MeOH | 25 | 25 | 1 | 1.8 | 0 | A | 20.8 |
| Comparative Example 1 | — | | — | — | — | — | 0 | 5.0 | A | 100 |
| Comparative Example 2 | Polyvinyl alcohol containing a methacrylamide group in side chain | | | | | | 4.3 | 0 | C | 6.5 |

As seen from Examples 1 to 7, a vinyl alcohol-based polymer having an olefin in side chain of the present invention keeps high water-solubility even after thermal treatment, and can be made water-resistant by UV crosslinking. A vinyl alcohol-based polymer having an olefin in side chain of the present invention can be, therefore, used in an extensive applications of a vinyl alcohol-based polymer.

As shown in Comparative Example 1, a vinyl alcohol-based polymer without an olefin in side chain cannot be made water-resistant by UV irradiation. As shown in Comparative Example 2, when an α,β-unsaturated olefin is introduced, it is crosslinked by thermal treatment, leading to considerable deterioration of water-solubility.

The invention claimed is:

1. A vinyl alcohol-based polymer, comprising an olefin in a side chain which is not of an α,β-unsaturated type, and comprising 0.001 to 10 mol %, based on a total amount of structural units, of a structural unit represented by Formula (1):

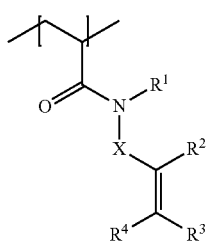

(1)

wherein X represents an optionally substituted divalent aliphatic hydrocarbon group, an optionally substituted divalent alicyclic hydrocarbon group, an optionally substituted divalent aromatic hydrocarbon group, or a group consisting of two or more groups selected from the group consisting of an optionally substituted divalent aliphatic hydrocarbon group, an optionally substituted divalent alicyclic hydrocarbon group, and an optionally substituted divalent aromatic hydrocarbon group, wherein the two or more groups are linked via at least one bond selected from the group consisting of an amide bond, an ester bond, an ether bond, and a sulfide bond;

$R^1$, $R^2$, $R^3$ and $R^4$, independently of each other, represent a hydrogen atom, an optionally substituted aliphatic hydrocarbon group, an optionally substituted alicyclic hydrocarbon group, or an optionally substituted aromatic hydrocarbon group; and X, $R^1$, $R^2$, $R^3$ and $R^4$ optionally form a ring structure, and wherein a total carbon number of X, $R^1$, $R^2$, $R^3$ and $R^4$ is 2 or more.

2. The vinyl alcohol-based polymer of claim 1, wherein the total carbon number of X, $R^1$, $R^3$, $R^3$ and $R^4$ is 4 to 7.

3. The vinyl alcohol-based polymer of claim 1, wherein $R^1$ is a hydrogen atom.

4. The vinyl alcohol-based polymer of claim 1, wherein X is an optionally substituted divalent aliphatic hydrocarbon group.

5. The vinyl alcohol-based polymer of claim 1, wherein $R^3$ is a hydrogen atom and $R^4$ is a hydrogen atom.

6. A method for producing a vinyl alcohol-based polymer, comprising an olefin side chain which is not of an α,β-unsaturated type, and comprising 0.001 to 10 mol %, on a total amount of structural units, of a structural unit represented by Formula (1):

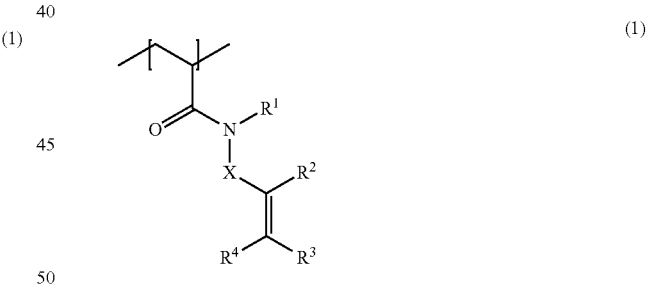

(1)

wherein X represents an optionally substituted divalent aliphatic hydrocarbon group, an optionally substituted divalent alicyclic hydrocarbon group, an optionally substituted divalent aromatic hydrocarbon group, or a group consisting of two or more groups selected from the group consisting of an optionally substituted divalent aliphatic hydrocarbon group, an optionally substituted divalent alicyclic hydrocarbon group, and an optionally substituted divalent aromatic hydrocarbon group, wherein the two or more groups are linked via at least one bond selected from the group consisting of an amide bond, an ester bond, an ether bond, and a sulfide bond;

$R^1$, $R^2$, $R^3$ and $R^4$, independently of each other, represent a hydrogen atom, an optionally substituted aliphatic hydrocarbon group, an optionally substituted alicyclic hydrocarbon group, or an optionally substituted aromatic hydrocarbon group; and X, $R^1$, $R^2$, $R^3$ and $R^4$ optionally form a ring structure, and wherein a total carbon number of X, $R^1$, $R^2$, $R^3$ and $R^4$ is 2 or more, the method comprising:

addition-reacting a vinyl alcohol-based polymer comprising a structural unit represented by Formula (2) with an amine compound represented by Formula (3):

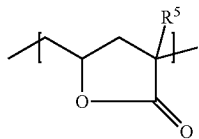

(2)

wherein $R^5$ represents a hydrogen atom or a methyl group;

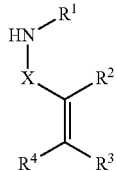

(3)

wherein X, $R^1$, $R^2$, $R^3$ and $R^4$ are as defined in Formula (1).

* * * * *